United States Patent Office.

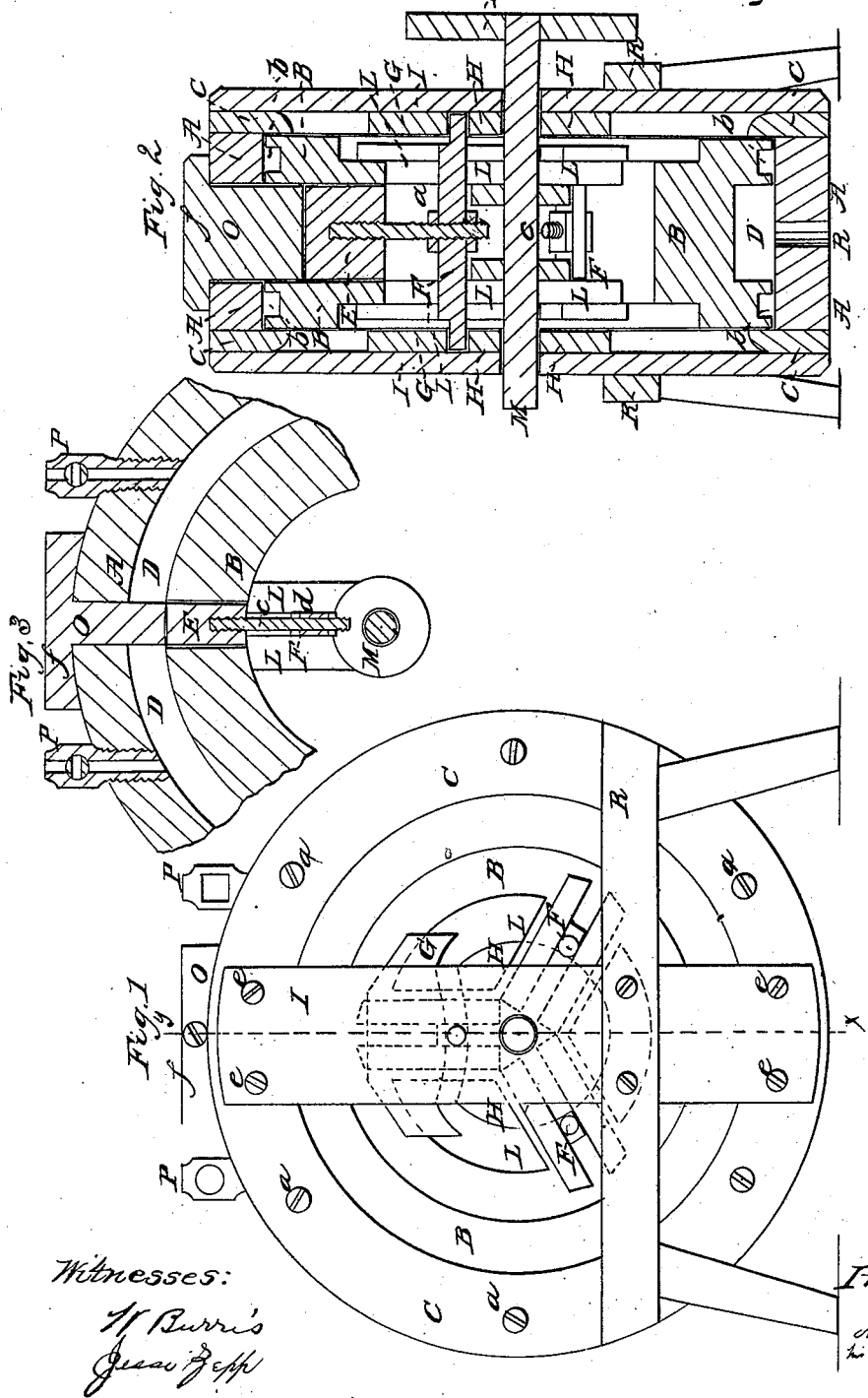

MATTHIAS RIKERT, OF ONEIDA, ILLINOIS.

Letters Patent No. 76,525, dated April 7, 1868.

IMPROVEMENT IN ROTARY STEAM-ENGINES.

*The Schedule referred to in these Letters Patent and making part of the same.*

TO ALL WHOM IT MAY CONCERN:

Be it known that I, MATTHIAS RIKERT, of Oneida, in the county of Knox, and State of Illinois, have invented a new and useful Improvement in Rotary Steam-Engines; and I do hereby declare that the following is a full, clear, and exact description of the construction and operation of the same, reference being had to the accompanying drawings, making a part of this specification, in which—

Figure 1 is a side elevation.

Figure 2 is a transverse sectional view, as indicated by the line $x\,y$ in fig. 1.

Figure 3 is a sectional view in detail of steam-passage, stop or partition-block, stop-cocks, and valve or piston.

Like letters in the different figures of the drawings indicate like parts.

The nature of my invention consists in the arrangement of a stop or partition-block, three valves or pistons, trams and cams, and standards, whereby I accomplish the purpose of giving either a forward or backward motion to the engine, in a very simple and effective manner.

To enable any one skilled in the art to make and use my invention, I will proceed to describe its construction and operation.

A is the outer circle of the engine, of a suitable thickness and width, with the sides and inner surface thereof turned true. B is the inner circle or wheel, sufficiently loose to allow of its turning freely around on the inner surface of the outer circle, and secured therein by circular flanges C C, which are attached to the outer circle by bolts or screws $a$. The inner circle will be made steam-tight by metallic packing, and springs suitably secured in the grooves $b\,b$, with set-screws. D is the steam-passage.

I use three pistons or valves E E E, fitting properly in boxes or openings extending through the inner circle B to the steam-passage, and made steam-tight therein, by suitable packing. The pistons are attached to arms F F F, by screw-rods $c$ and screw-nuts $d$. The arms have their ends made to fit properly between the trams G G and cams H H, which trams and cams are constructed in the form shown partially in dotted lines in fig. 1, and are attached to and back of the standards by screws or bolts. I I are the standards which are attached to the outer circle by screws or bolts $e\,e$, and being attached to the pieces K K resting on legs, support the engine. In the revolution of the wheel B, the arms F F F work up and down between the double arms L, which connect with the wheel B and the shaft M. The shaft M has a hand-pulley, N, on the end of it. The shaft passes through holes in the standards, and has its bearings therein.

O is the stop or partition-block. It is made to fit tightly through an opening in the head, and closes the steam-passage at that point. Having a cap, $f$, it is secured to the head of the engine by screws or bolts passing through it and thence into the head. Suitable packing is used to make it steam-tight. P P are stop-cocks, which will connect with steam-pipes. By changing the steam from one stop-cock to the other, the engine may be given either a forward or backward movement. R is the escape.

Operation: When steam is introduced in the steam-passage through one of the stop-cocks P, the valves or pistons E E E receive the pressure of the steam, and thus cause a rotary movement to be given to the wheel B, which motion is then transmitted to the band-pulley N from the shaft; each piston being drawn toward the centre of the engine, when they approach the block O, so that they will clear and pass under the same, and immediately upon leaving it will be thrown out into the steam-passage to receive the steam as before.

Having thus fully described my invention, what I claim therein as new, and desire to secure by Letters Patent, is—

The arrangement of the stop or partition-block O, pistons E E E, trams G G, and cams H H, and standards I I, substantially in the manner and for the purpose as herein shown and described.

MATTHIAS RIKERT.

Witnesses:
A. F. BOON,
J. STAFFORD.